United States Patent
Yang et al.

(10) Patent No.: US 12,437,409 B2
(45) Date of Patent: Oct. 7, 2025

(54) METHOD FOR PROCESSING IMAGES, ELECTRONIC DEVICE, AND STORAGE MEDIUM

(71) Applicant: HON HAI PRECISION INDUSTRY CO., LTD., New Taipei (TW)

(72) Inventors: Jung-Hao Yang, New Taipei (TW); Chin-Pin Kuo, New Taipei (TW); Chih-Te Lu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 553 days.

(21) Appl. No.: 17/896,842

(22) Filed: Aug. 26, 2022

(65) Prior Publication Data

US 2023/0326029 A1    Oct. 12, 2023

(30) Foreign Application Priority Data

Apr. 8, 2022 (CN) .......................... 202210369448.5

(51) Int. Cl.
*G06T 7/11* (2017.01)
*H04N 13/271* (2018.01)

(52) U.S. Cl.
CPC .............. *G06T 7/11* (2017.01); *H04N 13/271* (2018.05)

(58) Field of Classification Search
CPC .............. H04N 13/271; G06T 7/10–11; G06V 10/26–273; G06V 10/25–255
See application file for complete search history.

(56) References Cited

U.S. PATENT DOCUMENTS

| 10,832,432 B2* | 11/2020 | Anisimovskiy | G06T 7/80 |
| 2021/0150278 A1* | 5/2021 | Dudzik | G06T 7/593 |
| 2022/0057806 A1* | 2/2022 | Guo | G06V 20/58 |

FOREIGN PATENT DOCUMENTS

TW    I532619    5/2016

OTHER PUBLICATIONS

A. Mukherjee, S. Sarkar and S. K. Saha, "Object Mapping from Disparity Map by Fast Clustering," 2020 IEEE Calcutta Conference (CALCON), Kolkata, India, 2020, pp. 74-79, doi: 10.1109/CALCON49167.2020.9106512 (Year: 2020).*

(Continued)

*Primary Examiner* — Vu Le
*Assistant Examiner* — Jack Peter Kraynak
(74) *Attorney, Agent, or Firm* — ScienBiziP, P.C.

(57) ABSTRACT

A method for processing images implemented in an electronic device includes obtaining images during moving of a vehicle; obtaining instance segmentation images by segmenting the images; obtaining a predicted disparity map by reconstructing the left images based on a pre-established autoencoder; generating a first error value of the autoencoder for the images according to the left image, the predicted disparity map, and the right image, generating a second error value of the autoencoder for the instance segmentation image according to the left image of instance segmentation, the predicted disparity map, and the right image of instance segmentation; establishing an autoencoder model by adjusting the autoencoder according to the first error value and the second error value; obtaining a test image as the vehicle is moving, and obtaining a target disparity map; and obtaining a depth image corresponding to the test image by converting the target disparity map.

20 Claims, 4 Drawing Sheets

(56) References Cited

OTHER PUBLICATIONS

J. Zhang, K. A. Skinner, R. Vasudevan and M. Johnson-Roberson, "DispSegNet: Leveraging Semantics for End-to-End Learning of Disparity Estimation From Stereo Imagery," in IEEE Robotics and Automation Letters, vol. 4, No. 2, pp. 1162-1169, Apr. 2019, doi: 10.1109/LRA.2019.2894913. (Year: 2019).*

L. Chen et al., "Shape Prior Guided Instance Disparity Estimation for 3D Object Detection," in IEEE Transactions on Pattern Analysis and Machine Intelligence, vol. 44, No. 9, pp. 5529-5540, 1 Sep. 2022, doi: 10.1109/TPAMI.2021.3076678. (Year: 2021).*

W. Zhou, J. Wu, J. Lei, J.-N. Hwang and L. Yu, "Salient Object Detection in Stereoscopic 3D Images Using a Deep Convolutional Residual Autoencoder," in IEEE Transactions on Multimedia, vol. 23, pp. 3388-3399, 2021, doi: 10.1109/TMM.2020.3025166 (Year: 2021).*

S. Papadopoulos, I. Mademlis and I. Pitas, "Neural vision-based semantic 3D world modeling," 2021 IEEE Winter Conference on Applications of Computer Vision Workshops (WACVW), Waikola, HI, USA, 2021, pp. 181-190, doi: 10.1109/WACVW52041.2021.00024. (Year: 2021).*

M. Durner, W. Boerdijk, M. Sundermeyer, W. Friedl, Z.-C. Márton and R. Triebel, "Unknown Object Segmentation from Stereo Images," 2021 IEEE/RSJ International Conference on Intelligent Robots and Systems (IROS), Prague, Czech Republic, 2021, pp. 4823-4830 (Year: 2021).*

\* cited by examiner

METHOD FOR PROCESSING IMAGES, ELECTRONIC DEVICE, AND STORAGE MEDIUM

FIELD

The subject matter herein generally relates to images, and particularly to an electronic device, a method for processing images, and a storage medium.

BACKGROUND

Autonomous driving technology is developing fast. When a vehicle is automatically driving, pedestrians, vehicles, or obstacles around the vehicle are required to be monitored at all times by capturing depth images. However, accuracy requirements and fineness of depth determinations may lead to larger and longer data calculations, which may eventually affect safety of autonomous driving.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
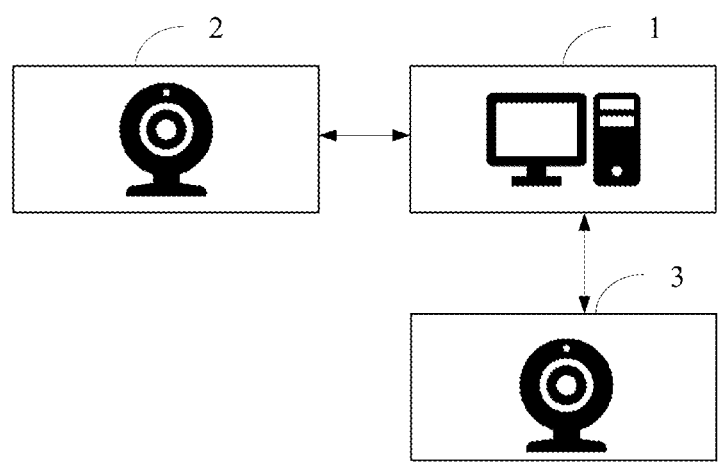
FIG. 1 is a schematic view of an embodiment of application environment of a method for processing images according to the present disclosure.

Multiple embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may present methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those of skill in the art may readily understand that these orders may vary and still remain within the essence and scope of the embodiments of the present disclosure.

Unless otherwise defined, technical terms or scientific terms used in the embodiments shall have common meanings as construed by those of ordinary skills in the art to which the present disclosure pertains. The terms "first", "second" and the like used in the embodiments of the present disclosure do not represent any order, quantity, or importance, but are merely used to distinguish different components. The terms "include", "contain" or the like mean that elements or articles appearing before such terms cover elements or articles listed after the words and their equivalents without excluding other elements or articles. The terms "connect", "link" or the like are not limited to physical or mechanical connection, but may include electrical connections, whether direct or indirect.

Referring to FIG. 1, an electronic device 1 is illustrated. The electronic device 1 may be a personal computer, a server, etc., the server may be a single server, a server cluster, or the like.

A method for processing images is applied in at least one electronic device 1. The electronic device 1 communicates with a binocular camera device 2 and a camera device 3.

The method for processing images acquires and processes related data based on artificial intelligence technology. AI is a theory, method, technology, or application system for simulation of intelligence by machine, extension of human intelligence, environmental perception, knowledge acquisition, and obtaining the best results based on the knowledge using digital computers or machines controlled by digital computers.

The basic technologies of AI generally include technologies such as sensors, special AI chips, cloud computing, distributed storage, big data processing technology, operation/interaction systems, and mechatronics. AI software technology mainly includes computer vision technology, robotics technology, biometrics technology, speech processing technology, natural language processing technology, and machine learning/deep learning.

In one embodiment, the electronic device 1 can be in a wired network environment or in a wireless network environment. The wireless network can be radio, WI-FI, or cellular network. The cellular network can be a 4G network or a 5G network.

In one embodiment, the electronic device 1 may include at least one network device and/or at least one user device. The network device includes, but is not limited to, a single network server, a server group including a number of network servers, or cloud including a large number of hosts or web servers based on cloud computing.

Figure 2:
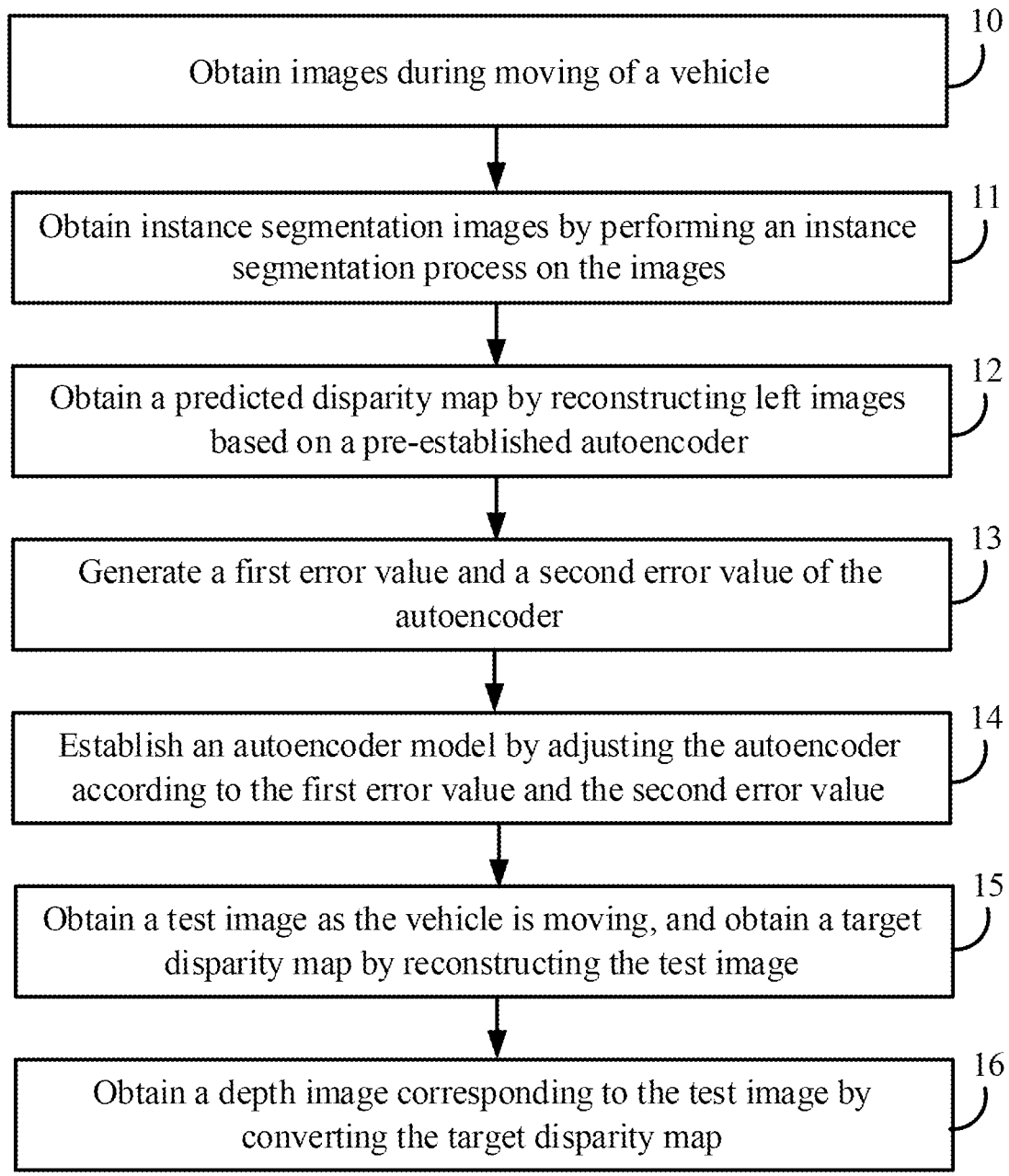
FIG. 2 illustrates a flowchart of an embodiment of a method for processing images according to the present disclosure.

FIG. 2 illustrates a flowchart of an embodiment of a method for processing images. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 10.

At block 10, obtaining images during moving of a vehicle, the images includes at least one left image and at least one right image.

In one embodiment, the vehicle may be any vehicle that is required autonomous driving.

In one embodiment, the images can be captured by the binocular camera device during travelling of the vehicle. The binocular camera device includes two lenses.

The left image can be an image of a view as the vehicle is moving captured by a left lens of the binocular camera device. The left image may be obtained from a first preset database having a storage relationship with the left lens. The first preset database stores a plurality of images captured by the left lens and the capture time of each image.

The right image can be an image of a view as the vehicle is moving captured by a right lens of the binocular camera device. The right image may be obtained from a second preset database having a storage relationship with the right lens. The second preset database stores a plurality of images captured by the right lens and the capture time of each image.

In one embodiment, obtaining images during travelling of a vehicle includes: obtaining the at least one left image and the at least one right image by controlling the binocular camera device to capture images of the view as the vehicle is moving, at this time, the binocular camera device can capture the images of the view as the vehicle is moving in real time; and/or obtaining images corresponding to the vehicle from the first preset database as the left images, obtaining the capture time of each left image from the first preset database, and obtaining images corresponding to the vehicle from the second preset database as the right images, and obtaining the capture time of each right image from the second preset database. According to the vehicle and the capture time, the right image which corresponds to a left image can be accurately obtained.

In one embodiment, the images captured as the vehicle is moving can be obtained from various sources, which is beneficial to the adjustment of an autoencoder.

At block 11, obtaining instance segmentation images by performing an instance segmentation on the images, the instance segmentation images include the left images of instance segmentation corresponding to the left images and the right images of instance segmentation corresponding to the right images.

In one embodiment, the instance segmentation images include label information of the images as the vehicle is moving. It can be understood that when the image information of a cat is in the image, box information indicating the cat is included in the instance segmentation image.

In one embodiment, obtaining instance segmentation images by performing an instance segmentation on the images includes: obtaining output images by inputting the images as the vehicle is moving into a pre-trained instance segmentation model; detecting a segmentation accuracy of the instance segmentation model for segmenting the images based on the output images; if the segmentation accuracy is greater than a preset threshold, the output images are determined as the instance segmentation images.

In one embodiment, the instance segmentation model includes a feature extraction layer, a feature mapping layer, and a classification layer etc. The feature extraction layer may include a plurality of convolutional layers, the feature extraction layer is used to extract features in the images as the vehicle is moving. The feature mapping layer is used to map the features of the same object into a feature map. For example, if the image as the vehicle is moving shows a pedestrian object and a cat object, the feature map obtained by the feature mapping layer carries the features of the pedestrian object, and the features of the cat object. The classification layer includes a fully connected layer, the classification layer is used to recognize the category of the object corresponding to the feature map.

In one embodiment, the preset threshold may be determined according to actual requirements, for example, the preset threshold may be 95%.

The instance segmentation model can realize automatic instance segmentation of the images as the vehicle is moving, thereby improving the efficiency of generation of the output image. At the same time, by detecting the output image, the accuracy of the instance segmentation image can be improved.

In one embodiment, detecting a segmentation accuracy of the instance segmentation model based on the output images includes: recognizing an object position where the object label is located in the image as the vehicle is moving; obtaining a predicted position corresponding to the object label from the output image; obtaining the segmentation accuracy by calculating a ratio of the position difference between the predicted position and the object position to the object position.

The object position and the predicted position are analyzed through the same object label, so as to improve the calculation accuracy of the segmentation accuracy.

At block 12, obtaining a predicted disparity map by reconstructing the left images based on a pre-established autoencoder.

In one embodiment, the predicted disparity map includes a predicted disparity value of each pixel in the left image. The auto-encoder includes an encoder and a decoder.

In one embodiment, obtaining predicted disparity maps by reconstructing the left images based on a pre-established autoencoder includes: obtaining a feature vector of the left image by encoding the left image based on the encoder; obtaining the predicted disparity map by mapping the feature vector based on the decoder. Through the above-mentioned embodiments, the predicted disparity map can be quickly generated.

At block 13, generating a first error value of the autoencoder for processing the image as the vehicle is moving according to the left image, the predicted disparity map, and the right image, and generating a second error value of the autoencoder for processing the instance segmentation image according to the left image of instance segmentation, the predicted disparity map, and the right image of instance segmentation.

In one embodiment, generating a first error value of the autoencoder for the images as the vehicle is moving according to the left image, the predicted disparity map, and the right image includes: obtaining the predicted disparity value corresponding to each pixel in the left image from the predicted disparity map; locating a first pixel position of each pixel in the left image; determining a second pixel position based on the predicted disparity value and the first pixel position; obtaining an RGB pixel value of the pixel corresponding to the first pixel position from the left image; generating the predicted right image of the left image of the autoencoder according to the RGB pixel value of the pixel corresponding to the first pixel position and the second pixel position; and calculating the first error value according to the right image and the predicted right image.

The first error value is calculated according to the following formula:

$$MSE = (y - \hat{y})^2;$$

In the formula, MSE represents the first error value, y represents the RGB pixel value of the right image, and $\hat{y}$ represents the RGB pixel value of the predicted right image.

In one embodiment, the predicted right image is generated by taking the RGB pixel value at each first pixel position in the left image as the RGB pixel value at each second pixel position, for example, the RGB pixel value of the pixel at the first pixel position (100, 200) in the left image is x, the predicted disparity value of the first pixel position (100, 200) of the left image in the predicted disparity map is (20,0), the second pixel position in the predicted right image is (120, 200), the RGB pixel value of the corresponding pixel of the second pixel position (120, 200) is x.

In one embodiment, determining a second pixel position based on the predicted disparity value and the first pixel position includes: obtaining the second pixel position by calculating a sum of the predicted disparity value and the first pixel position.

For example, if the first pixel position is (100, 200), the predicted disparity value of the first pixel position (100, 200) in the predicted disparity map is (20, 0), the position of the second pixel in the predicted right image is (120, 200).

The predicted right image can be accurately determined through the left image and the predicted disparity map, and the first error value can be accurately determined by analyzing the pixel relationship between the right image and the prediction right image.

In one embodiment, the embodiment of generating the second error value of the autoencoder for the instance segmentation image according to the left image of instance segmentation, the predicted disparity map, and the right image of instance segmentation is the same as the embodiment of generating a first error value of the autoencoder for the images as the vehicle is moving according to the left image, the predicted disparity map, and the right image.

At block 14, establishing an autoencoder model by adjusting the autoencoder according to the first error value and the second error value.

In one embodiment, the autoencoder model has a minimum total training error value.

In one embodiment, establishing an autoencoder model by adjusting the autoencoder according to the first error value and the second error value includes: obtaining the total training error value of the autoencoder by calculating a sum of the first error value and the second error value; establishing the autoencoder model by adjusting configuration parameters of the autoencoder, until the total training error value no longer decreases.

In one embodiment, the configuration parameters are the parameters of the initialization configuration of the decoder and the encoder, for example, the configuration parameters include the number of deconvolution layers in the decoder and the size of kernel of the convolution layers in the deconvolution layers, and the configuration parameter further includes the number of layers of the convolutional layers in the encoder and the size of the convolutional kernels in the convolutional layers.

Through the first error value and the second error value, the total training error value can be accurately determined, thereby improving the accuracy of the autoencoder model.

At block 15, obtaining a test image as the vehicle is moving, and obtaining a target disparity map by reconstructing the test image according to the autoencoder model.

In one embodiment, the test image is the image of the view of the vehicle to be tested as the vehicle is moving. The target disparity map includes the disparity value corresponding to each pixel in the test image.

In one embodiment, the embodiment of obtaining the target disparity map by reconstructing the test image according to the autoencoder model is the same as the embodiment of obtaining the predicted disparity map by reconstructing the left images based on a pre-established autoencoder.

At block 16, obtaining a depth image corresponding to the test image by converting the target disparity map.

In one embodiment, the depth image is a depth map of the view of the vehicle to be tested as the vehicle is moving. The depth image includes a distance value from the capturing device of the test image to an object in the view.

In one embodiment, obtaining a depth image corresponding to the test image by converting the target disparity map includes: obtaining a focal length value of the capturing device of the test image, and obtaining a distance between the lenses in the capturing device; obtaining a target disparity value of each pixel in the test image from the target disparity map: calculating a depth pixel value corresponding to each pixel in the test image according to the focal length value, the distance, and the target disparity value, and generating the depth image according to the pixels and the depth pixel value of each pixel in the test image.

The depth pixel value is calculated according to the following formula:

$$z = b \times f/d;$$

In the formula, z represents the depth pixel value, b is the distance between the lenses, f represents the focal length value, and d represents the target disparity value.

Through the above-mentioned embodiments, the depth image can be accurately generated, which is beneficial to control the automatic driving of the vehicle to be tested.

It can be seen from the above technical solutions that the present application can accurately recognize the label information in the images as the vehicle is moving by performing and instance segmentation process on the images as the vehicle is moving, and analyze the predicted disparity map generated by encoding the left image. The first error value of the autoencoder on the images as the vehicle is moving and the second error value of the autoencoder on the instance segmentation image enhance the consistency of the predicted disparity map on the same object, and the interference of the autoencoder on the image encoding can be eliminated, the accuracy of the first error value and the second error value can be improved. The autoencoder can be adjusted by combining the first error value and the second error value, which can further improve the image processing capability of the autoencoder model, so that the test driving image can be processed based on the autoencoder model, and the accuracy and fineness of the depth image can be improved, thereby improving automatic driving, accuracy.

Figure 3:
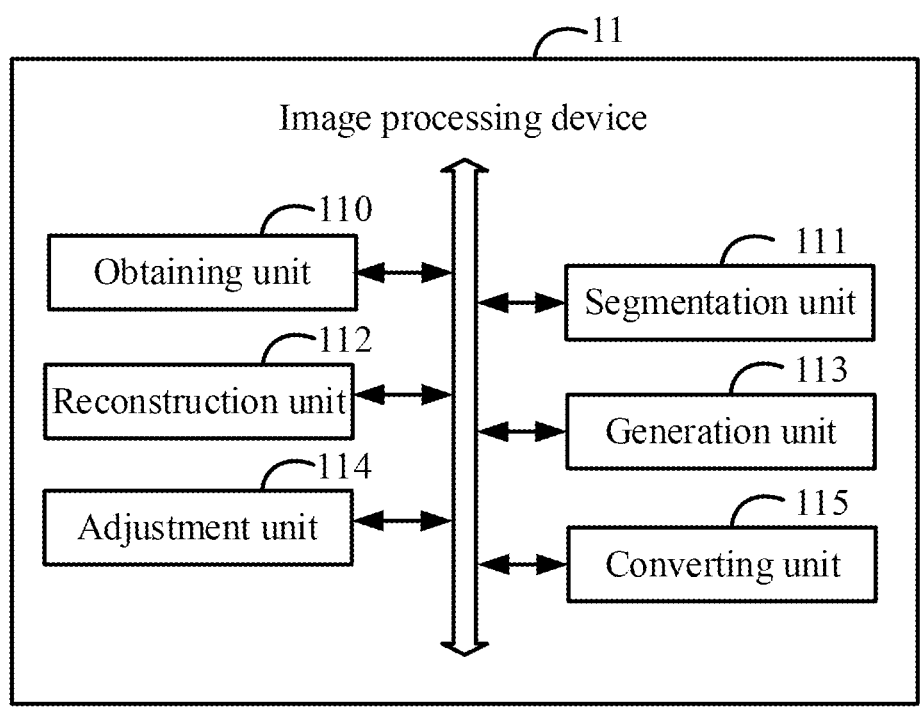
FIG. 3 is a block diagram of an embodiment of an image processing device according to the present disclosure.

Referring to FIG. 3, an image processing device includes an obtaining unit 110, a segmentation unit 111, a reconstruction unit 112, a generation unit 113, an adjustment unit 114, and a converting unit 115. The units 110-115 can be collections of software instructions stored in the storage device 12, and executed by the medical processor 22. The units 110-115 also can include functionality represented as hardware or integrated circuits, or as software and hardware combinations, such as a special-purpose processor or a general-purpose processor with special-purpose firmware.

The obtaining unit 110 obtains images during travelling of a vehicle, the images includes at least one left image and at least one right image.

The segmentation unit 111 obtains instance segmentation images by performing an instance segmentation on the images, the instance segmentation images include the left images of instance segmentation corresponding to the left images and the right images of instance segmentation corresponding to the right images.

The reconstruction unit 112 obtains a predicted disparity map by reconstructing the left images based on a pre-established autoencoder.

The generation unit 113 generates a first error value of the autoencoder for the image as the vehicle is moving according to the left image, the predicted disparity map, and the right image, and generating a second error value of the autoencoder for the instance segmentation image according to the left image of instance segmentation, the predicted disparity map, and the right image of instance segmentation.

The adjustment unit 114 establishes an autoencoder model by adjusting the autoencoder according to the first error value and the second error value.

The reconstruction unit 112 further obtains a test image as the vehicle is moving, and obtains a target disparity map by reconstructing the test image according to the autoencoder model.

The converting unit 115 obtains a depth image corresponding to the test image by converting the target disparity map.

Figure 4:
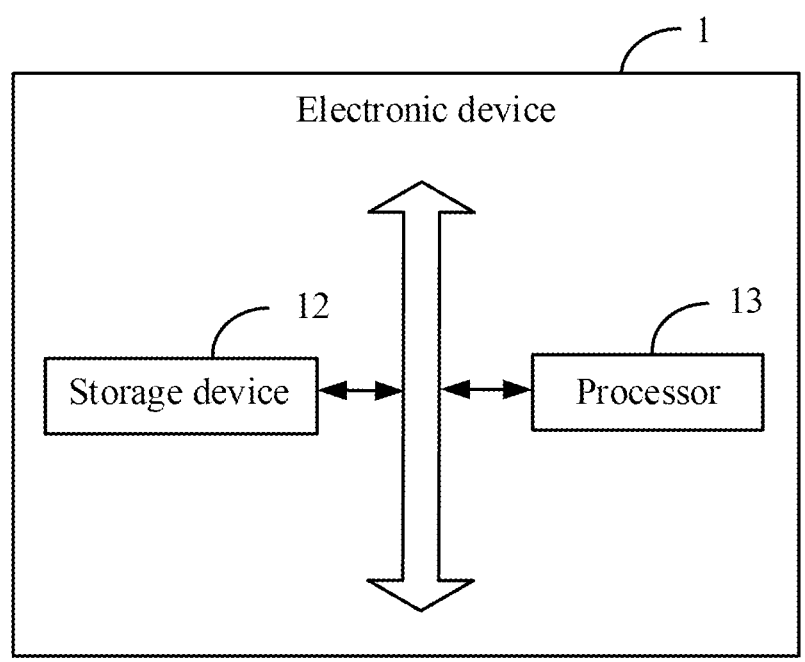
FIG. 4 is a block diagram of an embodiment of an electronic device according to the present disclosure.

FIG. 4 illustrates the electronic device 1 in one embodiment. The electronic device 1 includes, but is not limited to, a processor 13, a storage device 12, and a computer program. FIG. 4 illustrates only one example of the electronic device 1. Other examples can include more or fewer components than as illustrated or have a different configuration of the various components in other embodiments.

The processor 13 can be a central processing unit (CPU), a microprocessor, or other data processor chip that performs functions in the electronic device 1.

In one embodiment, the storage device 12 can include various types of non-transitory computer-readable storage mediums. For example, the storage device 12 can be an internal storage system, such as a flash memory, a random access memory (RAM) for the temporary storage of information, and/or a read-only memory (ROM) for permanent storage of information. The storage device 12 can also be an external storage system, such as a hard disk, a storage card, or a data storage medium.

The storage device 12 stores instructions, the processor 13 executes the computer program stored in the storage device 12 for implementing the method for processing images provided in the embodiments of the present disclosure. The computer program 30 is an image processing program and includes instructions.

Upon execution of the instructions stored in the storage device 12, the processor 13 is configured to:
 obtain images during travelling of a vehicle, the images includes at least one left image and at least one right image;
 obtain instance segmentation images by performing an instance segmentation on the images, the instance segmentation images include the left images of instance segmentation corresponding to the left images and the right images of instance segmentation corresponding to the right images;
 obtain a predicted disparity map by reconstructing the left images based on a pre-established autoencoder;
 generate a first error value of the autoencoder for the image as the vehicle is moving according to the left image, the predicted disparity map, and the right image, and generating a second error value of the autoencoder for the instance segmentation image according to the left image of instance segmentation, the predicted disparity map, and the right image of instance segmentation;
 establish an autoencoder model by adjusting the autoencoder according to the first error value and the second error value;
 obtain a test image as the vehicle is moving, and obtains a target disparity map by reconstructing the test image according to the autoencoder model;
 obtain a depth image corresponding to the test image by converting the target disparity map.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A method for processing images implemented in an electronic device comprising:
 obtaining images when a vehicle is moving, the images comprising at least one left image and at least one right image;
 obtaining instance segmentation images by performing an instance segmentation process on the images, the instance segmentation images comprising left images of instance segmentation corresponding to the left images and right images of instance segmentation corresponding to the right images;
 obtaining a predicted disparity map by reconstructing the left images based on a pre-established autoencoder;
 generating a first error value of the autoencoder for processing the images according to the at least one left image, the predicted disparity map, and the at least one right image, and generating a second error value of the autoencoder for processing the instance segmentation images according to the left images of instance segmentation, the predicted disparity map, and the right images of instance segmentation;
 establishing an autoencoder model by adjusting the autoencoder according to the first error value and the second error value;
 obtaining a test monocular image as the vehicle is moving, and obtaining a target disparity map by reconstructing the test monocular image according to the autoencoder model; and
 obtaining a depth image corresponding to the test monocular image by converting the target disparity map.

2. The method according to claim 1, wherein obtaining images when a vehicle is moving comprises:
 obtaining the left images and the right images by controlling a binocular camera device to capture images of a view as the vehicle is moving; or
 obtaining images corresponding to the vehicle from a first preset database as the left images, obtaining capture time of each of the left images from the first preset database, and obtaining the images corresponding to the vehicle from a second preset database as the right images, and obtaining capture time of each of the right images from the second preset database.

3. The method according to claim 1, wherein obtaining instance segmentation images by performing an instance segmentation process on the images comprises:
 inputting the images as the vehicle is moving into a pre-trained instance segmentation model, and obtaining output images of the pre-trained instance segmentation model;

detecting a segmentation accuracy of the instance segmentation model for segmenting the images based on the output images; and in response that the segmentation accuracy is greater than a preset threshold, determining the output images to be the instance segmentation images.

4. The method according to claim 1, wherein obtaining a predicted disparity map by reconstructing the left images based on a pre-established autoencoder comprises:

obtaining a feature vector of the left images by encoding the left images based on an encoder of the autoencoder; and obtaining the predicted disparity map by mapping the feature vector based on a decoder of the autoencoder.

5. The method according to claim 1, wherein generating a first error value of the autoencoder for processing the images according to the at least one left image, the predicted disparity map, and the at least one right image comprises:

obtaining a predicted disparity value corresponding to each pixel in the left image from the predicted disparity map;

locating a first pixel position of each pixel in the left image;

determining a second pixel position based on the predicted disparity value and the first pixel position;

obtaining an RGB pixel value of the pixel corresponding to the first pixel position from the left image;

generating a predicted right image corresponding to the left image by the autoencoder according to the RGB pixel value of the pixel corresponding to the first pixel position and the second pixel position; and calculating the first error value according to the right image and the predicted right image.

6. The method according to claim 5, wherein the first error value is calculated according to a formula of:

$$MSE=(y-\hat{y})^2;$$

in which, MSE representing the first error value, y representing the RGB pixel value of the right image, and ŷ representing the RGB pixel value of the predicted right image.

7. The method according to claim 1, wherein establishing an autoencoder model by adjusting the autoencoder according to the first error value and the second error value comprises:

obtaining a total training error value of the autoencoder by calculating a sum of the first error value and the second error value; and adjusting configuration parameters of the autoencoder, until the total training error values do not decrease, and the autoencoder model being established.

8. The method according to claim 1, wherein obtaining a depth image corresponding to the test monocular image by converting the target disparity map comprises:

obtaining a focal length value of a capturing device of the test monocular image, and obtaining a distance between lenses of the capturing device;

obtaining a target disparity value of each pixel in the test monocular image from the target disparity map;

calculating a depth pixel value corresponding to each pixel in the test monocular image according to the focal length value, the distance, and the target disparity value; and generating the depth image according to the pixels and the depth pixel value of each of the pixels in the test monocular image.

9. An electronic device comprising:
at least one processor; and
a storage device coupled to the at least one processor and storing instructions for execution by the at least one processor to cause the at least one processor to:

obtain images when a vehicle is moving, wherein the images comprise at least one left image and at least one right image;

obtain instance segmentation images by performing an instance segmentation process on the images, wherein the instance segmentation images comprise left images of instance segmentation corresponding to the left images and right images of instance segmentation corresponding to the right images;

obtain a predicted disparity map by reconstructing the left images based on a pre-established autoencoder;

generate a first error value of the autoencoder for processing the images according to the at least one left image, the predicted disparity map, and the at least one right image, and generating a second error value of the autoencoder for processing the instance segmentation images according to the left images of instance segmentation, the predicted disparity map, and the right images of instance segmentation;

establish an autoencoder model by adjusting the autoencoder according to the first error value and the second error value;

obtain a test monocular image during moving of the vehicle, and obtain a target disparity map by reconstructing the test monocular image according to the autoencoder model; and obtain a depth image corresponding to the test monocular image by converting the target disparity map.

10. The electronic device according to claim 9, wherein the at least one processor is further caused to:

obtaining the left images and the right images by controlling the binocular camera device to capture images of a view as the vehicle is moving; or obtain images corresponding to the vehicle from the first preset database as the left images, obtain the capture time of each of the left images from the first preset database, and obtain the images corresponding to the vehicle from the second preset database as the right images, and obtain the capture time of each of the right images from the second preset database.

11. The electronic device according to claim 9, wherein the at least one processor is further caused to:

input the images as the vehicle is moving into a pre-trained instance segmentation model, and obtain output images of the pre-trained instance segmentation model;

detect a segmentation accuracy of the instance segmentation model for segmenting the images based on the output images; and in response that the segmentation accuracy is greater than a preset threshold, determine the output image to be the instance segmentation images.

12. The electronic device according to claim 9, wherein the at least one processor is further caused to:

obtain a feature vector of the left image by encoding the left images based on an encoder of the autoencoder; and obtain the predicted disparity map by mapping the feature vector based on a decoder of the autoencoder.

13. The electronic device according to claim 9, wherein the at least one processor is further caused to:

obtain the predicted disparity value corresponding to each pixel in the left image from the predicted disparity map;

locate the first pixel position of each pixel in the left image; determining a second pixel position based on the predicted disparity value and the first pixel position;

obtain an RGB pixel value of the pixel corresponding to the first pixel position from the left image;

generate the predicted right image corresponding to the left image by the autoencoder according to the RGB pixel value of the pixel corresponding to the first pixel position and the second pixel position; and calculate the first error value according to the right image and the predicted right image.

14. The electronic device according to claim 9, wherein the first error value is calculated according to a formula of:

$$MSE=(y-\hat{y})^2;$$

in which, MSE representing the first error value, y representing the RGB pixel value of the right image, and ŷ representing the RGB pixel value of the predicted right image.

15. The electronic device according to claim 9, wherein the at least one processor is further caused to:

obtain the total training error value of the autoencoder by calculating the sum of the first error value and the second error value; and adjust configuration parameters of the autoencoder, until the total training error values do not decrease, and establish the autoencoder model.

16. The electronic device according to claim 9, wherein the at least one processor is further caused to:

obtain a focal length value of a capturing device of the test monocular image, and obtain the distance between the lenses in the capturing device;

obtain a target disparity value of each pixel in the test monocular image from the target disparity map;

calculate the depth pixel value corresponding to each pixel in the test monocular image according to the focal length value, the distance, and the target disparity value; and generate the depth image according to the pixels and the depth pixel value of each of the pixels in the test monocular image.

17. A non-transitory computer-readable storage medium having instructions stored thereon, when the instructions are executed by a processor of an electronic device, the processor is configured to perform a method for processing images, wherein the method comprises:

obtaining images when a vehicle is moving, wherein the images comprise at least one left image and at least one right image;

obtaining instance segmentation images by performing an instance segmentation process the images, wherein the instance segmentation images comprise left images of instance segmentation corresponding to the left images and right images of instance segmentation corresponding to the right images;

obtaining a predicted disparity map by reconstructing the left images based on a pre-established autoencoder;

generating a first error value of the autoencoder for processing the images as the vehicle is moving according to the at least one left image, the predicted disparity map, and the at least one right image, and generating a second error value of the autoencoder for processing the instance segmentation images according to the left images of instance segmentation, the predicted disparity map, and the right images of instance segmentation;

establishing an autoencoder model by adjusting the autoencoder according to the first error value and the second error value;

obtaining a test monocular image as the vehicle is moving, and obtaining a target disparity map by reconstructing the test monocular image according to the autoencoder model; and obtaining a depth image corresponding to the test monocular image by converting the target disparity map.

18. The non-transitory computer-readable storage medium according to claim 17, wherein obtaining images when a vehicle is moving comprises:

obtaining the left images and the right images by controlling the binocular camera device to capture images of a view as the vehicle is moving; or obtaining images corresponding to the vehicle from the first preset database as the left images, obtaining the capture time of each of the left images from the first preset database, and obtaining the images corresponding to the vehicle from the second preset database as the right images, and obtaining the capture time of each of the right images from the second preset database.

19. The non-transitory computer-readable storage medium according to claim 17, wherein obtaining instance segmentation images by performing an instance segmentation process on the images comprises:

inputting the images as the vehicle is moving into a pre-trained instance segmentation model, and obtaining output images of the pre-trained instance segmentation model;

detecting a segmentation accuracy of the instance segmentation model for segmenting the images based on the output images; and in response that the segmentation accuracy is greater than a preset threshold, determine the output image to be the instance segmentation images.

20. The non-transitory computer-readable storage medium according to claim 17, wherein obtaining a predicted disparity map by reconstructing the left images based on a pre-established autoencoder comprises:

obtaining a feature vector of the left image by encoding the left images based on an encoder of the autoencoder; and obtaining the predicted disparity map by mapping the feature vector based on a decoder of the autoencoder.

* * * * *